April 28, 1931. M. C. GRUBB 1,802,646
WOOD SAWING APPARATUS
Filed Sept. 13, 1928 2 Sheets-Sheet 1

Inventor
Melvin C. Grubb.

Eccleston & Eccleston
Attorneys

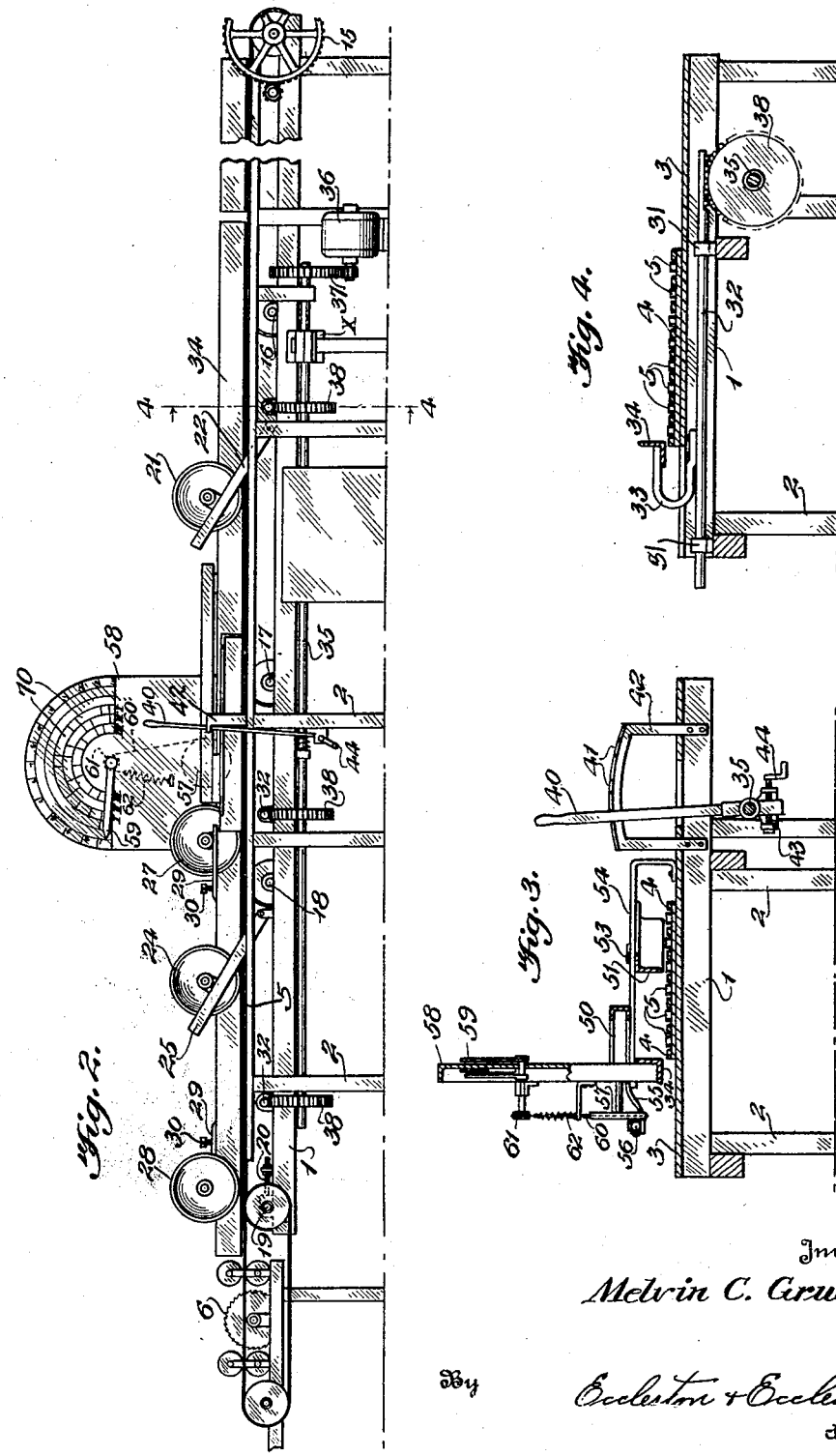

Patented Apr. 28, 1931

1,802,646

UNITED STATES PATENT OFFICE

MELVIN C. GRUBB, OF ATHENS, OHIO

WOOD-SAWING APPARATUS

Application filed September 13, 1928. Serial No. 305,702.

This invention relates to sawing apparatus of the ripsaw type and has for its primary object to provide in connection with a ripsaw and its feed table a mechanism by means of which the lumber being operated upon is measured as to width and then moved laterally with respect to the gang saws so as to cut the board into strips of the desired width with a minimum amount of waste.

A further object of the invention resides in the provision of such a device in which the gauging mechanism automatically registers the proper position which the measured piece of lumber should take relative to the saws, together with mechanism for moving the lumber to the indicated position, said latter mechanism bearing indicia corresponding to the indicia on the gauging mechanism.

Other objects and advantages of the invention will be apparent from the following description when taken in connection with the accompanying drawings; in which Figure 1 is a plan view of the apparatus with parts broken away.

Figure 2 is a side elevation thereof with parts also broken away.

Figure 3 is a transverse sectional view taken on line 3—3 of Figure 1, and

Figure 4 is a transverse sectional view taken on line 4—4 of Figure 2.

Figure 1:
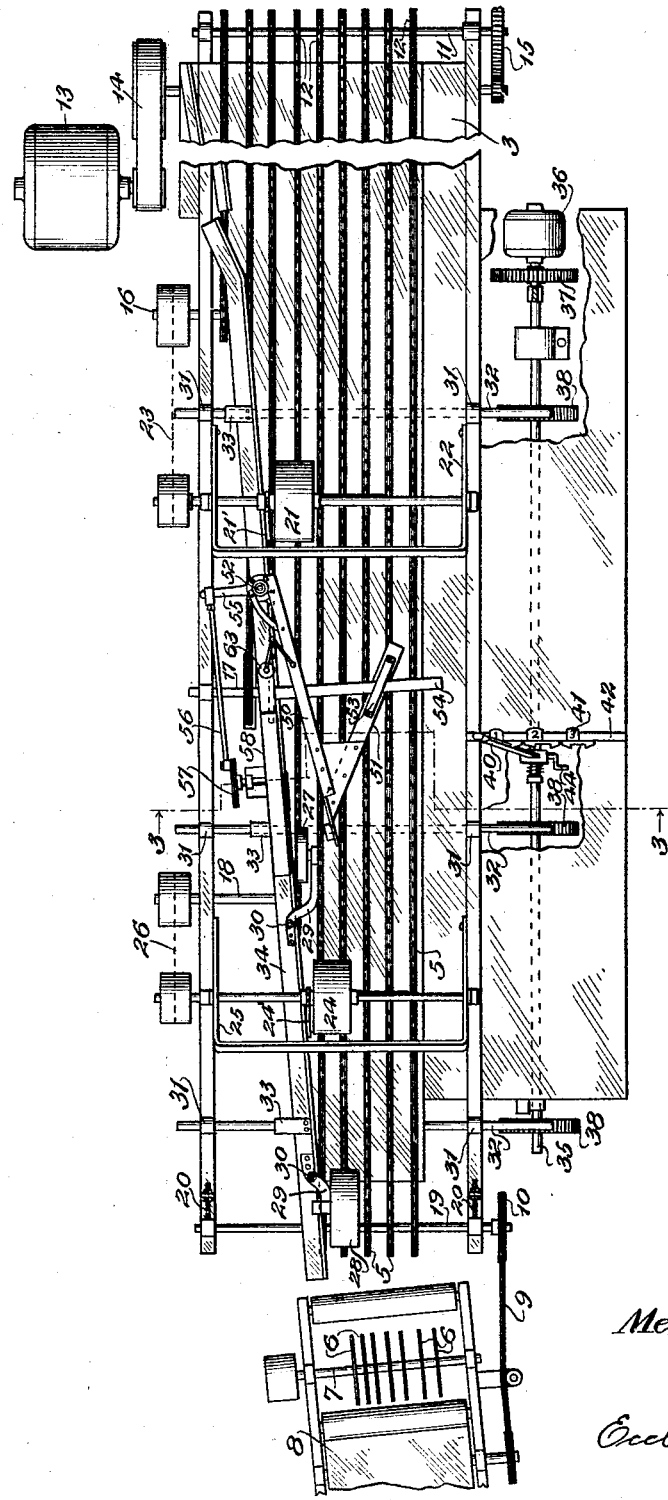

Referring to the drawings in greater detail, the numeral 1 indicates generally a saw table provided with legs 2 and a top 3. The table may be formed of wood or metal, but is here shown as made of metal and has mounted on the top thereof a plurality of spaced strips 4 which provide grooves or trackways in the table top for a plurality of chains 5.

Chains 5 serve to carry the lumber along the top of the table to the gauging device and to the saws 6 which are associated with the table as indicated at the left of Figures 1 and 2. These saws, which per se form no part of the present invention, are of the rotary type and are adjustably mounted on a shaft 7. There are seven of these saws in the present instance, the first three being spaced 1⅞" apart while the others are spaced 2⅝" apart. It is to be understood, however, that this spacing of the saws is dependent entirely on the size of strips desired and the exact distances between saws as given is merely for the purpose of furnishing a concrete example of the operation of the gauging device which will be described hereinafter. The saws 6 as well as a conveyor 8 may be operated continuously from any desired source of power, but I have here shown the conveyor as operated by means of a sprocket chain 9 which is geared to a sprocket wheel 10 mounted on one of the shafts of the feed table.

I will not describe the manner of conveying the boards to the saws and then the devices by which the boards are first gauged and then moved laterally to bring into operation those saws which will provide the maximum amount of usable material from the particular width of board.

Mounted at the forward end of the table 1 is a horizontally disposed shaft 11 to which are fixed a plurality of sprocket wheels 12; nine of these wheels being shown in the present instance. This shaft is rotated by motor 13 through suitable reduction gearing 14 and 15 as indicated in Figure 1 and serves to impart movement to the chains 5 which are associated with the sprocket wheels. The first four of these chains, i. e., the chains nearest the motor, extend over only a portion of the surface of the table; the first chain passing over a sprocket on counter shaft 16, the second and third chains passing over sprockets on counter shaft 17, and the fourth chain passing over a sprocket wheel on counter shaft 18. The remainder of the chains extend the full length of the table and pass over sprockets on shaft 19 which is adjustable by means of screws 20 to take up any slack in the chains.

The chains 5 which as already stated travel in grooves of the table top formed by the strips 4 extend above the top of the slots about one sixteenth of an inch and will therefore carry the lumber forward along the table as it is placed thereon. In order to render this driving means for the lumber more positive I provide a power driven roller 21 which is mounted over the chains by means of a pivoted yoke 22 and which permits the roller to rise to accommodate different thicknesses of lumber. This roller 21 is driven by a crossbelt 23 associated with shaft 16, and a similar roller 24 mounted on a similar yoke 25 is driven by a crossbelt 26 driven from shaft 18. It will thus be apparent that a positive drive for the lumber is provided and one which is automatically adjustable to different thicknesses of lumber. In order to insure the engagement of the lumber with the chains 5, hold-down idle rollers 27 and 28 are provided. These rollers are mounted on springs 29 and are adjustable by means of screws 30 so as to prevent any engagement of the rollers with the chains 5 when idle.

Slidably mounted in bearings 31 below the top of table 1 are three horizontally and transversely disposed rods 32. Mounted on the bars or rods 32 intermediate their ends are U-shaped brackets 33, which serve as supports for a diagonally disposed angle iron 34 and which space the same slightly above the table top and the chains 5 mounted thereon. This element 34, which may be termed a fence, sets at an angle or lead of 24 inches in 20 feet so as to insure a perfect measuring or gauging of the width of the lumber by the automatic measuring device to be described, and it is because of this angular position of the fence 34 that certain of the conveyor chains extend over only a portion of the length of the table. In order to insure the proper spacing of the rollers 21 and 24 with respect to the fence 34, the rollers 21 and 24 are splined to their respective shafts and may be slid along the shafts by means of forks 21′ and 24′ which are fixed to the fence 34 and have their opposite ends in engagement with annular grooves in the hubs of the rollers. It will thus be apparent that the distance between the fence and the rollers is fixed irrespective of movements of the former.

Extending longitudinally of the table and below the top thereof is a shaft 35 which may be rotated by a motor 36 and suitable reduction gearing 37 or by a hand lever. This shaft has fixed thereto three gear wheels 38 which cooperate with racks formed on the lower sides of the bars 32, and it is obvious that when rotary motion is imparted to the gear wheels 38 by means of motor 36, the bars 32 and the fence 34 carried thereby will be moved bodily across the table to an extent dependent upon the extent of rotation of the gears.

Fixed to the shaft 35 is a manually operable lever 40 which is adapted, in the present instance, to be held in any one of three different positions by means of notches 41 on a bracket 42. The lever 40 is adjustably mounted on shaft 35 so that it may be made to conform to any variations in the working parts of the apparatus. To this end a bracket 43 is fixed to the shaft 35 while the lever 40 is loosely pivoted thereon, and connection is made between the lever and bracket by means of the screw 44. It will thus be apparent that the lever may be adjusted about the shaft 35 as a center by suitable manipulation of the screw and thus bring the lever into proper position relative to the other parts of the mechanism in the event of wear on these parts or if, for any other reason, their proper relationship should be disturbed.

As previously mentioned, one of the primary objects of this invention resides in the provision of means for automatically gauging the width of the lumber operated upon and indicating the proper position for the lumber relative to the saws in order to reduce wastage to a minimum. For this purpose a gauging member comprising the angularly arranged angle irons 50 and 51 is pivotally connected to the fence 34 as indicated by the numeral 52. This member is supported in horizontal position by means of a strap 53 which passes over a bar 54 secured to the table 1. Extending rearwardly from member 50 at its pivot point is an arm 55 to which is pivotally connected a rod 56. The opposite end of rod 56 is pivotally connected to a gear wheel 57 and causes the latter to move back and forth about its pivot as the gauge 51 is caused to open and close by the passage of lumber through the apparatus. The gear wheel 57 is mounted for rotation on the fence 34, and also mounted on the fence adjacent the gear wheel is a dial 58 with which is associated a pointer or indicator arm 59. This arm is operated across the face of the dial by means of a chain 60 which is associated with gear 57 and also passes over a gear 61 on the shaft to which the needle 59 is fixed. On the idle side of chain 60 is a spring 62 which serve to keep a tension on chain 60 and to return the parts of the gauging apparatus to normal position after each passage of a board through the apparatus. In this connection it should be noted that a dashpot connection 63 is provided between the fence 34 and gauge 50 so as to relieve the shock on these parts when the spring returns the gauge to inoperative position.

The pointer 59, which is moved varying degrees across the face of the dial 58 in accordance with the width of the board passing through the apparatus, cooperates with indicia on the dial to designate whether the lever 40 and the fence 34 operatively connected therewith should be moved to the first, second or third position in order to properly present the particular board to the saws so as to provide a maximum amount of usable material. For this purpose the face of the dial is provided with three concentrically arranged arcs I, II, III, on which colored blocks or other indicia 70 are placed in predetermined positions as shown and which will indicate to the operator whether the lever 40 should be moved to notch I, II or III. For instance, we will assume that a board 12½ inches in width is run over the feed table. As the board passes the gauging apparatus the needle 59 will swing to 12½ inches as indicated on the periphery of the dial, and in this position the indicia in arc I will appear just to the right of the needle, thus indicating to the operator that lever 40 should be moved to position I. By thus adjusting lever 40 and fence 34, the board will pass through the gang saws and five strips will be ripped, three of them 2⅝ inches wide and two of them 1⅞ inches wide. Likewise, if a board 5 inches wide is run through the measuring apparatus the indicia in arc II will appear just at the right of needle 59, indicating to the operator that lever 40 should be moved to notch II. When thus set, two strips will be ripped, one of them 2⅝ inches wide and the other 1⅞ inches wide. Again, if a board 5½ inches wide is run through the apparatus the needle will be swung to a position in which the indicia in arc III will appear just at the right thereof giving the indication that lever 40 is to be moved to notch III. When so positioned two strips will be ripped each being 2⅝ inches wide. It will thus be apparent that in the semi-automatic operation of the device the operator need only watch the dial 58 and then move the lever to the notch indicated thereon in order to produce a maximum amount of strips of the desired widths with a minimum wastage. It will, of course, be understood that the spacing of the saws as described is intended as merely illustrative of the invention, and that this spacing may be varied over a wide range provided the markings on the dial are changed to correspond to the altered conditions.

From the foregoing description and the attached drawing it will be apparent to those skilled in the art that I have combined with a ripsaw a simple and reliable construction for automatically indicating to the operator the most advantageous position to place a particular board to obtain a maximum amount of usable material, and that simplified means are also provided for shifting the lumber to the position desired.

In accordance with the patent statutes I have described what I now believe to be the preferred form of the invention. It should be noted, however, that various minor changes may be made in the details of construction without departing from the spirit of the invention, and all such changes are intended to be included within the scope of the appended claims.

Having fully described my invention what I claim as new and desire to secure by Letters Patent is:—

1. A sawing apparatus including a plurality of saws spaced at predetermined, unequal distances apart, a feed table for cooperation with said saws, an automatic gauge for measuring the width of the work passing through the apparatus, means for returning the gauge to normal position after each operation, and an indicator associated with said gauge for indicating the proper relative position between the work and saws.

2. A sawing apparatus including a plurality of unequally spaced saws, a feed table, means on the feed table for gauging the width of the work, an indicator associated with said gauging mechanism, and means whereby a lateral adjustment between said saws and the work may be made in accordance with the movements of said indicator.

3. A sawing apparatus including a plurality of unequally spaced saws, a feed table, a fence for adjusting the work transversely of the table, means for locking the fence in predetermined positions in which different saws or groupings of the saws become effective, a gauge on said fence for measuring the width of the work, and an indicator operable by said gauge for indicating one of said predetermined positions.

4. A sawing apparatus including a plurality of unequally spaced saws, a feed table, a fence extending longitudinally of said table and inclined with respect to an edge thereof, means for adjusting said fence to predetermined positions in which different saws or groupings of the saws become effective, a gauge for automatically measuring the width of the work, and an indicator associated with said gauge for indicating one of said predetermined positions.

5. In a sawing apparatus including a plurality of saws spaced at predetermined unequal distances apart, means controlled by the width of the work for indicating the point at which the work is to engage the saws, and means for causing a relative lateral movement between the work and saws.

6. In a sawing apparatus including a plurality of saws spaced at predetermined unequal distances apart, means controlled by the width of the work for indicating the point at which the work is to engage the saws, and means for shifting the work laterally to the indicated position.

7. A sawing apparatus including a plurality of saws spaced at predetermined unequal distances apart, a feed table for cooperation with said saws, means controlled by the width of the work for determining the point at which the work is to engage the saws, and means for shifting the work laterally to the indicated position.

8. A sawing apparatus including a plurality of saws spaced at predetermined, unequal distances apart, a feed table, means for adjusting the work transversely of the table, and a gauge operable by the work to indicate to the operator the particular group of said plurality of saws to be engaged by the piece of work.

9. A sawing apparatus including a plurality of saws spaced at predetermined, unequal distances apart, a feed table, means for adjusting the work transversely relative to the saws, a gauge operable by the work in accordance with its width, and an indicator associated with said gauge for designating to the operator the selected group of said plurality of saws to be engaged by the piece of work.

10. A sawing apparatus including a plurality of unequally spaced saws, a feed table, a fence for adjusting the work transversely of the table, means for predetermining certain positions of the fence with relation to different groupings of the saws, said means including a gauge on the fence for automatically measuring the width of the work and an indicator operable by said gauge for designating the position of the fence appropriate to the particular piece of work.

MELVIN C. GRUBB.